United States Patent [19]

Giacobbe et al.

[11] Patent Number: 5,219,535
[45] Date of Patent: Jun. 15, 1993

[54] HEATING AN ENDOTHERMIC PROCESS

[75] Inventors: Francesco Giacobbe; Lorena Mosca, both of Rome; Maurizio Bezzeccheri, Pompei, all of Italy

[73] Assignees: Mannesmann AG, Dusseldorf, Fed. Rep. of Germany; K.T.I. Group B.V., Zoetermeer, Netherlands

[21] Appl. No.: 719,645

[22] Filed: Jun. 21, 1991

Related U.S. Application Data

[63] Continuation of Ser. No. 434,224, Nov. 13, 1989, abandoned.

Foreign Application Priority Data

Nov. 10, 1988 [IT] Italy .............................. 48547 A/88

[51] Int. Cl.⁵ .............................................. F28D 7/10
[52] U.S. Cl. ..................... 422/201; 165/142; 165/159; 422/204; 422/205; 422/206
[58] Field of Search ............... 422/204, 205, 206, 201; 165/142, 159

[56] References Cited

U.S. PATENT DOCUMENTS

| | | | |
|---|---|---|---|
| 4,182,129 | 1/1980 | Haunold et al. | 165/142 |
| 4,430,304 | 2/1984 | Spurrier et al. | 422/204 |
| 4,504,447 | 3/1985 | Spurrier et al. | 422/204 |
| 4,746,329 | 5/1988 | Christener et al. | 422/204 |

Primary Examiner—Robert J. Warden
Assistant Examiner—Timothy M. McMahon
Attorney, Agent, or Firm—Cohen, Pontani, Lieberman, Pavane

[57] ABSTRACT

Apparatus for providing heat to a reaction chamber in which an endothermic reaction is performed under utilization of hot smoke gas includes a barrier, preferably a tubular barrier at least partially enclosing the reaction chamber but being spaced therefrom; hot smoke gas is fed to a ring chamber outside of the barrier and caused to flow there along while losing some of its heat content until at a lower end of the barrier the flow of the cooled smoke gas is reversed and the gas is introduced into a gap between the barrier and the reaction chamber so that heat is transferred through the barrier from the hot smoke gas as it flows along the outside of the barrier to the gas as it flows in the gap for heating the reaction chamber in an essentially uniform manner.

12 Claims, 2 Drawing Sheets

HEATING AN ENDOTHERMIC PROCESS

This is a continuation of U.S. application Ser. No. 07/434,224, filed Nov. 13, 1989 now abandoned.

BACKGROUND OF THE INVENTION

The present invention relates to a method and apparatus for the indirect heating of a process gas within a reaction chamber for an endothermic reaction, particularly, a catalytic reaction wherein the wall of the reaction chamber is surrounded by a flow of hot smoke gas for heating the interior of the chamber and particularly the process gas within said chamber.

A particularly preferred field of use of the present invention is the catalytic vapor reforming of hydrocarbons for manufacturing a gas that is rich in hydrogen. The process gas envisioned here is a blend of water vapor or steam, some hydrocarbon and/or $CO_2$. This blend is fed to a reaction chamber at a temperature of from 400° to 600° C. with pressures of up to 4 MPa. The reaction in the general sense may be performed through a plurality of catalyst filled tubes or pipes and the surrounding hot gas, so that the gas in the chamber is heated to 750°-900° C. With the assistance of the catalyst, the process gas then reacts endothermically to yield a hydrogen rich gas containing amounts of CO, $CO_2$ and an excess of steam and residual hydrocarbons. The hydrogen content of the product gas depends on the excess of the water vapor or steam, and on the temperature and pressure in the catalyst filled tubing. An increase in excess steam and/or temperature in the chamber will result in a corresponding increase in yield of hydrogen while an increase in the pressure causes a drop in the hydrogen yield.

European patent 194067 B1 describes an apparatus for carrying out such an endothermic catalytic reaction of a process gas. The apparatus includes a casing or housing with several, parallely arranged, catalyst filled tubes of the blind bore variety. Means are provided in the casing for feeding and discharging smoke gas so as to surround and heat the outer surfaces of these tubes while the process gas flows through this tubing while taking up heat. The catalyst filled tubes are surrounded by a tubular jacket which together with the tube forms a ring shaped chamber and a cylindrical gap. The jacket covers most of the respective catalyst filled tubing. The feeding of the smoke gas results in directly hitting the blind end of the catalyst filled tubes. This direct onflow and the immediate surrounding flow of the hot gas was found to be disadvantageous because in fact it establishes a very high thermal load on the blind end of the catalyst filled tubing. In certain critical spots the temperature of the jacket is actually raised to such a degree that it was damaged fairly soon and had to be exchanged rather frequently. This detriment can be counteracted by cooling the smoke gas which on the other hand is a somewhat wasteful procedure. One may also provide a heat exchanger in front of the tubing as far as the smoke gas is concerned or one can recycle some cooled smoke gas in order to reduce the temperature without any loss in thermal energy as far as the oncoming flow is concerned. A heat exchanger may also be used here but it was found that all these aspects provide for a rather expensive way of dealing with the situation.

Reducing the thermal load of the catalyst filled chamber is known by means of providing it on the outside with a ceramic jacket particularly in the area of the tubing which is hit first by the hot flow of smoke gas. However it was found that this kind of ceramic protective jacket is prone to respond rather drastically to temperature variations by expansion and contraction resulting in a damage to the ceramic and sooner or later in damage to the catalyst filled tube itself.

SUMMARY OF THE INVENTION

It is an object of the present invention to provide a new and improved method and apparatus for the indirect heating of a process gas stream within a reaction chamber for an endothermic catalytic reaction under utilization e.g. of catalyst filled tubes and to improve the heat exchange as far as heating the interior of these process chamber-tubes are concerned such that the thermal load on the walls of this reaction chamber, particularly these tubings, is rendered more uniform.

It is a particular object of the invention to improve equipment of the foregoing kind to avoid excessive heating where portions of reaction chambers come first in contact with the smoke gas whereby it is envisioned that known damage situations are to be avoided while on the other hand methods should be amenable to be practiced with simple equipment, i.e. without extensive supplemental expenditure, bearing in mind that energy must also not be wasted and the yield should not suffer.

In accordance with the preferred embodiment of the present invention it is suggested to provide a barrier along which the hot smoke gas is forced or at least caused to flow and which barrier is heat conductive as well as heat resistant and is spaced from the catalytic chamber thereby separating an inner from an outer flow space; the hot smoke gas provides thermal energy to said barrier when flowing along its outside so that the temperature of the smoke gas will be reduced and once the temperature has been sufficiently reduced so as not to pose danger to the walls of the reaction chamber, the flow of smoke gas is reversed and guided toward the inside of the barrier to flow along a gap between the barrier and the reaction chamber wall and in opposite direction as far as the original flow direction is concerned so as to obtain direct contact with the reaction chamber wall. The barrier to which the smoke gas previously had yielded heat now serves also as a heat source for this return flow of the smoke gas while the latter is actually heating the reaction chamber wall.

The invention arose in conjunction with technology mentioned in the introduction and relates particularly to catalytic reactions occurring in the interior of a reaction chamber. However it is believed that the inventive concept of heating is of broader significance and ultimately it does not matter whether or not the process in the interior of the reaction chamber is catalytically controlled or not. It is important, of course, that the process is an endothermic one i.e. one that requires the supply of thermal energy. The invention is directed specifically to a method wherein an extremely hot gas is used for first heating a barrier as an intermediate member which, once the heating gas has been somewhat cooled, causes the flow of the gas to reverse. The barrier serves thus as a supplemental source of thermal energy, and for reheating the gas, while the latter heats the reaction chamber, thereby providing additional heating for the reaction chamber without causing damage to the equipment due to excessively high temperatures. The barrier separates and thermally isolates the reaction chamber from the initial effect of the extremely hot heating gas.

The invention therefore is based on the principle to delay the contact of the reaction chamber with the heating gas until the heating gas has been cooled to a temperature where damage to the chamber will not occur. However, this "loss" in thermal energy is, as far as the heating process is concerned, not a true loss as the barrier simultaneously serves as an intermediate heat storage, delayedly providing, through a supplemental heating process as disclosed, a reheating of the smoke gas which, in turn, will transfer the energy to the reaction chamber, so that specifically, the zone containing the hottest smoke gas is juxtaposed with the zone containing the coolest smoke gas resulting in thermal equilibrium.

The barrier, as all major components, is preferably of tubular configuration. The process chamber when of tubular configuration should be made of a temperature resisting but highly thermal conductive material, preferably, a metal.

As stated and specifically owing to the indirect counterflow method that is employed, it is apparent that the hottest part of the barrier will heat the coolest part of the heating gas so that, as a consequence, an overall thermal balance is obtained with respect to the temperature of the gas as it heats the reaction chamber and the heating of the reaction as well as of the process gas is thus rendered more uniform. The basic concept of the invention is to be seen in using the highest temperature within the system, that is the temperature of the heating gas, as it enters the system, to heat the aforementioned barrier which, in turn, heats the coolest portion of the heating gas prior to being passed on to the reaction chamber.

Therefore, a heat exchange will occur between two partial flows of the same heating or smoke gas thereby reducing the temperature thereof to a level that will not cause any danger to the apparatus. Thus, the apparatus of the present invention does not utilize any blending or mixing of gases of differing temperature nor does it require an intermediate heat storage in the form of an external heat exchanger; all that is necessary is the additional barrier which provides for a reduction of the gas flow in a simple manner and inherently serves as temporary heat storage device.

Although the invention will be described below with reference to a single tubular chamber it is, of course, understood that neither a tubular chamber nor a single chamber is necessary; the configurations that are usable in connection with the present invention can be quite complex; what is involved is merely the dividing of the flow space of the oncoming heating gas by a barrier as it flows towards the process chamber. The barrier forms a temporary flow barrier, a temporary heat storage and also redirects the heating gas flow until its temperature has dropped to the desired degree.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PRESENTLY PREFERRED EMBODIMENT

Figure 1:
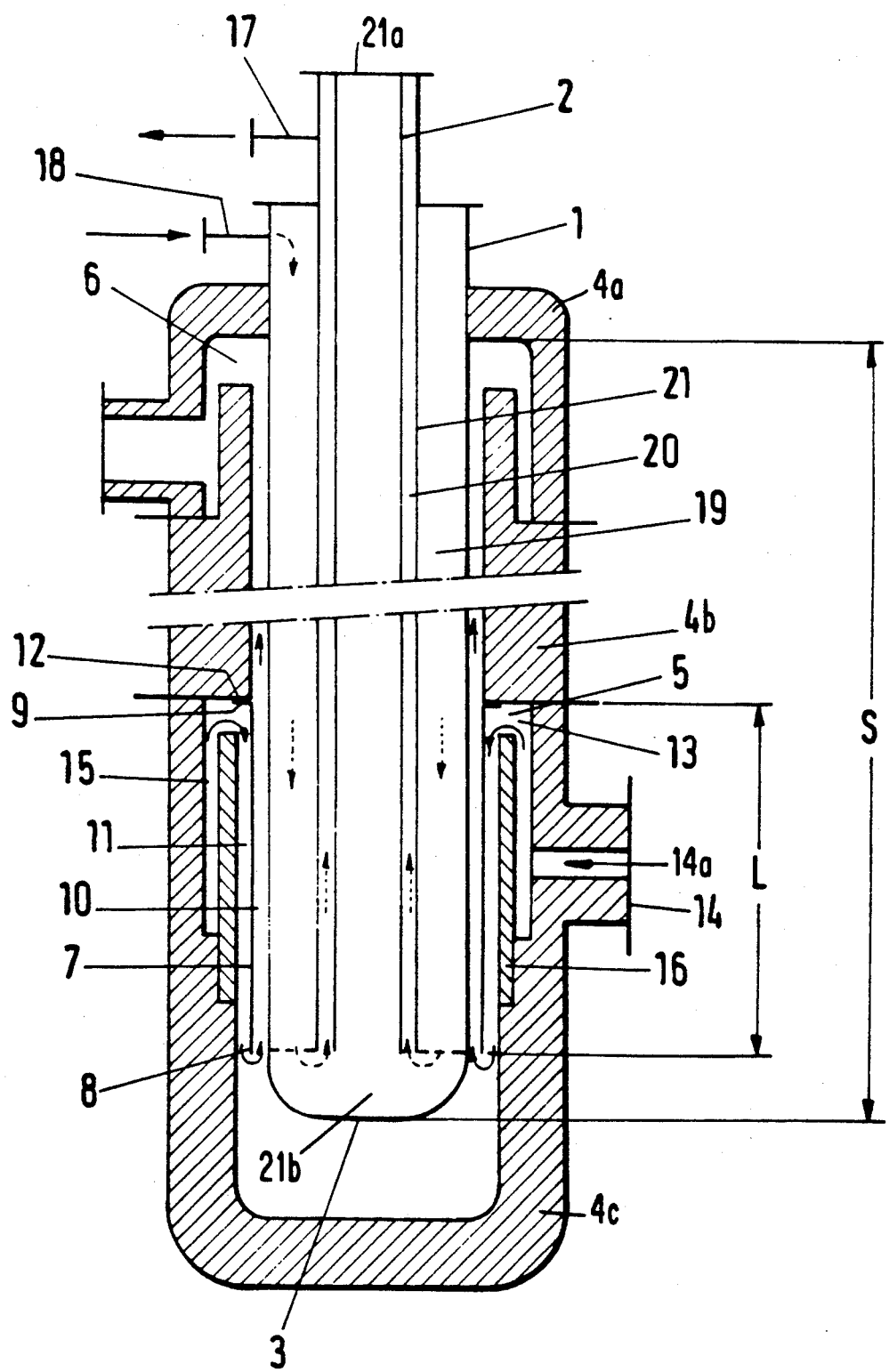
FIG. 1 is a longitudinal sectional view through a preferred embodiment of the present invention for practicing the best mode thereof.

Proceeding now to the detailed description of the drawings, FIG. 1 illustrates a device for carrying out an endothermic catalytic reaction, for example, a steam reformation of hydrocarbons. The process gas is a blend of water vapor (steam) and hydrocarbons. The reaction chamber is formed by a catalyst filled tube 1 which is enclosed by a casing or housing 4. The casing 4 includes, therefore, the tube 1 as well as additional equipment to be described in the following.

Other structural parts of the apparatus include a heat conducting metal tube 21 which is closed at the top 21a but open at the bottom 21b and is for most part disposed in the interior of tube 1. Tube 21 forms a coaxial tube system together with a coextensive flow displacement tube 2 inside tube 21. The catalyst is disposed between the inside wall of the tube 1 and the outside of heat conductive tube 21 and thus fills an outer ring space 19. Of course, "filled" is to be understood within the present context. The fill is very loose and leaves adequate flow space for the process gas to pass through.

The process gas is fed to the catalyst tube 1 through a connection 18, and flows into and down through the space 19 that is filled with the catalyst, until reaching the closed bottom end 3 of the tube 1. The remaining process gas as well as the product gas, i.e. the gas that is produced by the catalytic reaction, is now returned and flows upward through a ring space 20 located between the heat conductive tube 21 and the flow displacement or confining tube 2.

A discharge outlet 17 is connected to tube 21 for extracting the product gas from the system. A recuperative heat exchange through the wall of the heat conductive tube 21 will now occur between the reaction gas flowing through the ring space 19 and the heated product gas flowing through the ring space 20.

As mentioned, the reaction is endothermic and therefore requires heat which has to be provided in some fashion from the outside. To this end, the catalyst filled tube 1 is supplied from the outside with a hot smoke gas in a manner that constitutes a major aspect of the present invention as is described in the following.

Reference numeral 14 refers to an inlet for the smoke gas by means of which the hot smoke gas is fed (arrow 14a) into the housing 4. The very hot smoke gas is distributed into and through an annular gap or ring chamber 15 which is closed at the bottom. The annular gap or ring chamber 15 is formed by the housing 4, i.e. the inside wall of the housing or casing 4 and by a cylindrical insert 16. The smoke gas will leave the gap 15 in the upper direction through a smoke gas entrance chamber 5 formed as an annular channel 13.

An essentially uniformly distributed flow of heating gas, as far as periphery is concerned, enters a second ring chamber or annular gap 11. Second ring gap 11 is formed between the inserted tubing 16 and a barrier 7 constructed as a tubular body. Barrier tube 7 has a length L. The upper end 9 of barrier 7 is connected (flanged) to a ledge or shoulder of the housing 4 through a gas tight connection and seal 12. The smoke gas flows down through the second annular gap 11 and along the tubular body 7 until reaching the free lower end 8 of that thin wall tube 7. Here the flow direction is changed i.e. the lower part of the tube 7 redirects the flow of the smoke gas and the gas is caused to enter a gap 10.

Gap or third ring space 10 is formed between the outside of catalyst filled reaction chamber tube 1 and the inner portion of the tubular body 7. Gap 10 continues upwardly along tube 1 beyond the extent of tube 7 where gap 10 is formed between the inside of housing 4 and tube 1. The smoke gas will rise within gap 10 thus flowing along the catalyst containing reaction tube 1 and, in the lower portion of space 10, along the tubular body 7. Heat is thus transferred continuously from the smoke gas flow in gap 10 to the tubular body 1.

It is pointed out that the chamber within tube 1 is a location for an endothermic process so that, as seen from the outside, the body 1 is a heat sink. The smoke gas leaves the system at the exit 6 and is passed on through a chimney, or the like, or there may be another recuperative secondary heat exchanger or any other heat absorbing and transferring device provided, which is not important as far as the present invention is concerned.

It can be seen that the smoke gas continuously provides heat to the tube 1 across the ring gap 10. Preferably, in the inside of the chamber 1, the reaction gas flows in the opposite direction. Another heat exchange occurs between the hot gas flowing down in the ring gap 11, and the rising smoke gas as it flows in ring gap 10. This heat exchange, of course, is carried out through the barrier as formed by tubular body 7.

Tubular body 7 is preferably made of metal and is sufficiently heat resistant but also, of course, it is a very good conductor for heat. As a consequence of heat transfer through barrier 7, the hot gas will begin to cool as it passes through gap 11 before even coming into contact with tube 1. The dimensions are chosen so that the temperature of the smoke gas, as its flow is reversed at 8, has dropped to a value which poses no danger to the tube 1. On the other hand, the heat transfer in the lower part as well as throughout ring chamber or gap 10 causes the smoke gas temperature to cool less in spite of the continuous transfer of heat into chamber 19, due to the continued heat transfer and influx across barrier body 7. Therefore, in the longitudinal direction along heating tube 1 and its interior essentially uniform temperature conditions are maintained. It has been found that the axial length L of barrier 7 should be not less than about 1/10 but not more than 0.7 of the heatable length S of tube 1.

The inventive equipment is of rather simple construction and configuration which, if necessary, requires only the simple exchange of replacement parts. Most of the parts are interconnected in a releasable fashion to permit such an exchange with great ease. The housing 4 is comprised of an upper, a middle and a lower part or section (4a, 4b, 4c), respectively, which are interconnected through flange kind of connections. The insert 16 at the inlet 14 is rather strongly exposed to a hot temperature and the flow speed of the oncoming smoke gas may also be very strong so that there is a high thermal/mechanical load on cylindrical insert 16. It is, therefore, preferably made of a fireproof refractory material. In case of damage such a tube can be exchanged with ease and it is not too expensive to replace.

Tubular barrier 7, on the other hand, is made preferably of a high heat resisting steel but no significant mechanical wear occurs so that it does not have to be very thick. Moreover, barrier 7 is affixed by and at seal 12 to the casing 4 and particularly a ledge or shoulder while extending therefrom freely in downward direction. Therefore, whatever increase in length is experienced by tube 7 under the influence of heating, it is free to expand in downward direction, so that no mechanical load occurs on barrier 7.

The same, of course, is not true as far as the catalyst filled tube 1 is concerned owing to the fact that there is a significant pressure maintained in the catalytic process. This, however, is a situation that is inherent in whatever process one wants to control and conduct and has to be accommodated; avoidance of these conditions is inherently impossible. Owing to a difference in diameter as far as various tubes are concerned, one can provide a kind of selection and control for the heat exchange between the gaps 10 and 11 because by changing the diameter of barrier 7 (not its thickness!) the ratio of the free flow cross-sections of the two gaps 10, 11 is changed in opposite direction. The total cross-section of flow which is constant is determined by the difference in diameter between tube 1 and the inner diameter of casing 4. By changing the width of the gaps in opposite direction the heat transfer across barrier 7 is controlled. An enlargement of the diameter of tubular barrier 7 leads to a faster flow in ring gap 11 and a slow down of flow in gap 10. That, of course, has a corresponding influence on the heat exchange conditions between the two flows.

An analogous situation is present as far as the heat exchange between the product gas inside the tube 21 and the reaction gas outside of tube 21 is concerned. The tubular, flow displacement tube 2 is the controlling implement, a variation or a difference in diameter here causes a change in the free flow cross-section of the ring chamber 20 which then is influential in the heat exchange process between the flows in gap 10 and the inside of tube 1. If that cross-section is reduced then in fact one provides for a concentration of fast flowing gas along the wall of heat exchange tube 21 so that, through a given length, a particular rate of cooling occurs. The flange connection in the upper part of tube 21 permits easy exchange of the flow.

The inventive heating process guarantees a controlled decrease in the smoke gas temperature to a non-critical level as far as the catalyst filled tube 1 is concerned. Guiding the smoke gas through annular chamber 15, ring channel 13, second ring chamber 11 and ring space 10 results in a rather uniform temperature distribution to avoid localized thermal overloads.

Figure 2:
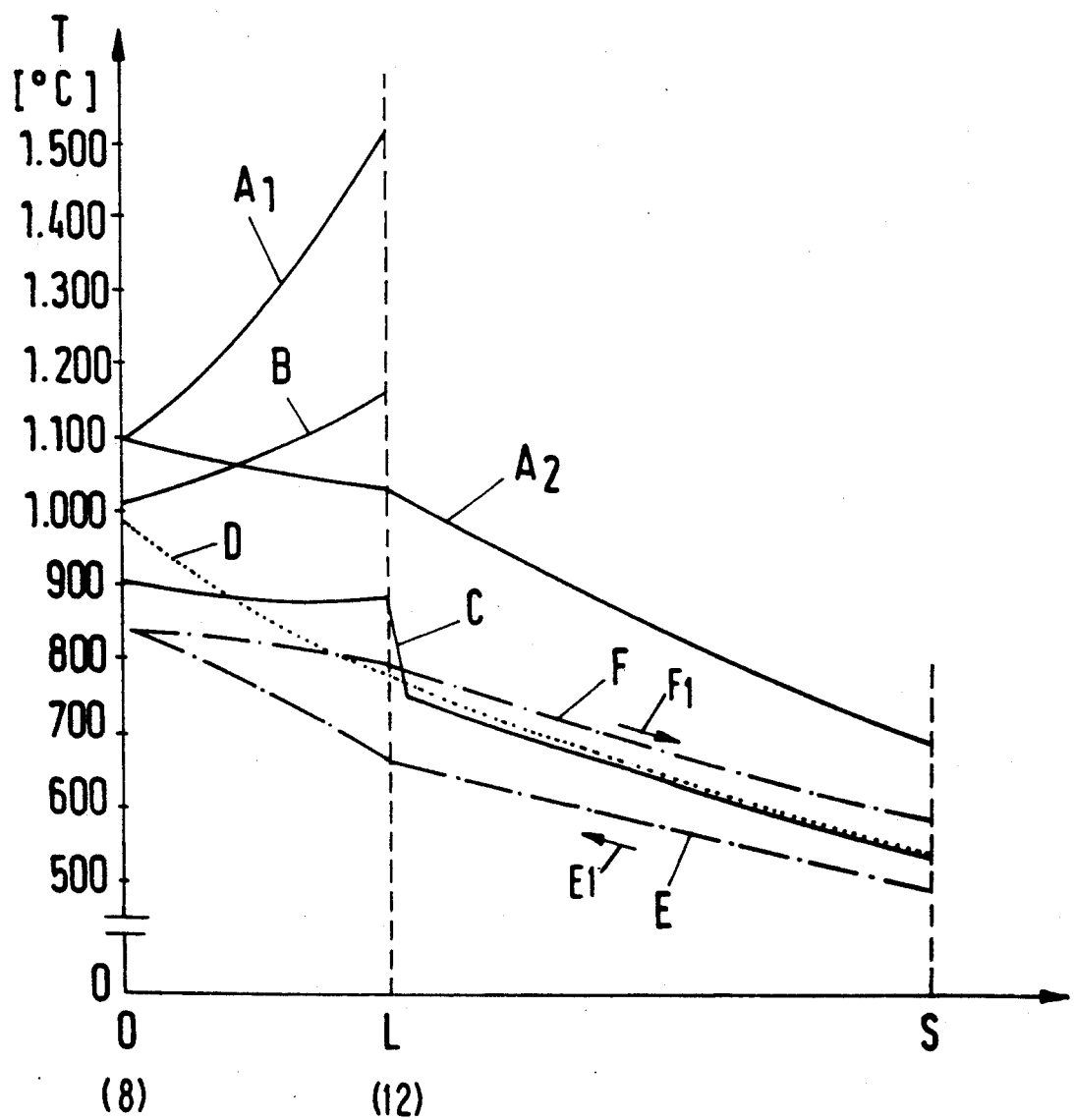
FIG. 2 is a temperature diagram for various situations and various spots comparing also the process in accordance with the invention with prior art practices.

The effectiveness of the present invention can be seen in FIG. 2 showing various temperature curves for comparative purposes as the temperature measured was plotted on the abscissa, i.e. along the heatable length S of the tube 1 and for a device in accordance with the present invention compared with a conventional device for hydrogen production through steam reforming under utilization of natural gas.

Curve A1 shows a temperature distribution for the inventive apparatus with a starting temperature of the smoke gas of about 1500° C. as it is present in the annular gap 11 in the upper part specifically of the tubular barrier 7 near seal 12. Here the smoke gas will flow down and at the lower end of the barrier 7, which is the end 8 in FIG. 1, the temperature has dropped to about 1100° C. Now, the flow reverses whereby cooling occurs in accordance with curve A2. One can readily see how the heat exchange through the barrier 7 establishes in effect uniform conditions in that the cooling of the smoke gas as flowing in gap 10 is now rather small and gradual.

The curve B shows the temperature of the barrier 7 along the length L and which drops from about 1175 degrees in the upper part to about 1010 degrees in the lower part. As there are no mechanical loads these thermal loads can easily be taken up by conventional hot strength steel as it is widely used for tubes.

The temperature distribution along the tubular wall 1 is shown in the curve C. Here, the temperature is almost constant over the length L (between 8 and 12) at about 900° C. but then drops rapidly to about 750° C. and from there it continues to drop to about 550° C. at the upper end of the housing 4. This shows clearly that the wall temperature in and of the catalyst filled tube 1 is maintained over the entire length S at noncritical levels. Such low temperatures, of course, were not possible if a smoke gas at an initial temperature of 1500° C. were to contact the tube 1 directly, without interpositioning of a metal barrier such as barrier tube 7. This condition is shown in curve D, showing that the lower part of the catalyst filled tube 1 would heat up to 1000° C. Curve D assumes that the barrier 7 has been removed.

The temperature distribution in the process gas is represented by the curve E. The process gas enters the catalyst filled tube 1 at a temperature of about 500° C. The flow direction is symbolically represented by the arrow E1. The temperature distribution of the product gas as it leaves (arrow F1) following the catalytic process is shown as curve F. E. and F, of course, merge at the left hand part of the diagram which is representative of the fact that there is a common flow E1-F1 with a turn around at 21b. One can also see a temperature decrease of the product gas from about 840 to about 600° C. which means that, in fact, though recuperative process (temperature differential between E and F) a large portion of the heat content of the product gas is transferred back to the process gas.

It can readily be seen that the inventive method and apparatus result in a simple construction and maintenance and that the apparatus can be used with particular advantage even in a small scale hydrogen production facility. Summarizing the various advantages the following point should be emphasized.

The tube wall temperature of the process chamber tube 1 is maintained with certainty below critical values. Due to the particular configuration of the barrier, such as the tube 7, one can maintain that configuration irrespective of differences in the heat content of the gas and fuel that is used for heating the process. The temperature of heating can be adjusted through appropriate adjustment of the diameter of the barrier 7. The barrier 7 provides a highly effective heat exchange between the reaction gas and the smoke gas. Particularly through homogenization or uniform rendering of the smoke gas flow one avoids local overheating. By varying and reducing the flow displacement tube 2 one can control the temperature reduction of the product gas. From an overall point of view the heat content of the smoke gas is very efficiently used which is beneficial as far as fuel consumption is concerned. Due to the flange connection between the heat exchange tube, the catalyst tube, and so forth, the exchange of the catalyst is a simple matter without having to remove the tube 1.

The invention is not limited to the embodiments described above but all changes and modifications thereof, not constituting departures from the spirit and scope of the invention, are intended to be included.

What is claimed is:

1. An apparatus for conducting an endothermic reaction of a process gas by indirect heat exchange with a hot heating gas to produce product gas, said apparatus comprising:
   a reaction chamber bounded by a first elongated annular wall, and comprising a closed bottom portion at one end thereof, a heatable length along said elongated wall and an inlet (18) for the process gas to be reacted therein;
   an elongated cylindrical member (21) disposed within said chamber in spaced relation to said first wall for providing a first flow channel (19) between said first annular wall and said cylindrical member for the process gas to flow in a direction, said member comprising a closed top portion and an open bottom spaced from and facing said closed bottom portion of said reaction chamber;
   a second annular wall surrounding said first annular wall of said reaction chamber in spaced relation thereto and forming a first flow channel (10) for the hot heating gas to flow therebetween along said heatable length of said reaction chamber, said flow channel having a first end, said second annular wall comprising a heat resistant, thermally conductive barrier circumjacent said first elongated annular wall of said reaction chamber and forming a part of said second wall, said barrier comprising a first and an oppositely disposed second end;
   a third heat resistant annular wall circumjacent said barrier and forming a second flow channel (11) for the hot heating gas therebetween, said second flow channel having a first end communicating with said first end of said first flow channel and a second oppositely disposed end;
   a third annular flow channel (15) for the hot heating gas disposed circumjacent said third annular wall, said third flow channel having a first end communicating with said second end of said second flow channel;
   means in communication with said third annular flow channel for introducing the hot heating gas thereto;
   said third, second and first flow channels forming an adjacent sequential continuing flow path for the heating gas so that the incoming heating gas initially transfers heat to said barrier when flowing through said second flow channel and then absorbs heat therefrom resulting in substantially uniform heating of said reaction chamber when flowing along said first flow channel.

2. The apparatus of claim 1, additionally comprising an insert (2) extending coaxially within said cylindrical member (21) and spaced therefrom for forming a second flow channel (20) for the product gas to flow in a direction opposite the direction of flow of said process gas.

3. The apparatus of claim 1, wherein said reaction chamber is tubular and said barrier is a sleeve having a length less than said heatable length of said reaction chamber.

4. The apparatus of claim 1, wherein said heat resistant, thermally conductive barrier has a length which is from 0.1 to 0.7 times said heatable length of said reaction chamber.

5. The apparatus of claim 1, wherein said second annular wall has a first thickness and said third annular wall has a second thickness, said first thickness being less than said second thickness.

6. The apparatus of claim 1, wherein said means for introducing the hot heating gas comprises an inlet for the heating gas at said first end of said barrier.

7. The apparatus of claim 1, additionally comprising a housing surrounding said reaction chamber, said housing forming said second annular wall; and said barrier being connected to and sealed with respect to said housing.

8. An apparatus for performing an endothermic reaction of a process gas by indirect heat exchange with a hot heating gas to form a product gas, comprising:
- means for reacting a product gas including an elongated reaction chamber (1) having an upper portion and a lower portion;
- a housing (4) surrounding said reaction chamber (1) and forming therebetween a first flow channel (10) for the hot heating gas to flow along said upper portion of said reaction chamber and in heat exchanging relation therewith;
- a thermally conductive barrier (7) attached to said housing (4) and extending for a predetermined length along said lower portion of said reaction chamber so as to form a continuation of said first flow channel (10) for the hot heating gas;
- a wall (16) between said barrier (7) and said housing (4) surrounding said barrier and forming a second flow channel (11) for the hot heating gas between said barrier (7) and said wall (16), said wall (16) being spaced from said housing for forming a third flow channel (15) for the hot heating gas; and
- said third, second and first flow channels forming a continuous adjacent, sequential flow path for (the) heating gas.

9. The apparatus of claim 8, additionally comprising a first insert extending coaxially within and spaced from said reaction chamber and forming a first flow channel for the process gas to flow in a direction;
- a second insert within said first insert forming a second flow channel for the product gas to flow in a direction opposite the direction of the process gas;
- said first flow channel for the hot heating gas being arranged so that the hot heating gas flows in a direction opposite the direction of flow of the process gas.

10. A method of performing an endothermic reaction by indirect heat exchange between a hot heating gas and a reactor having a predetermined heatable length for reacting a process gas therein to form a product gas and a housing, said method comprising:
- introducing a hot heating gas into a first flow channel surrounding the reactor, reversing the flow of the heating gas and introducing the heating gas into a second flow channel at a temperature and in contact with a first end of a heat conductive, heat resistant barrier having a length;
- leading the hot heating gas along the length of the barrier in the second flow channel so as to transfer heat to the barrier along the length thereof;
- again reversing the direction of flow of the heating gas by guiding the heating gas into a third flow channel between the barrier and the reactor;
- conducting the heating gas through the third flow channel in contact with the reactor beyond the length of the barrier and in contact with and between the reactor and the housing, said first, second and third flow channels forming an adjacent, continuous, sequential flow path; and
- permitting the heating gas to simultaneously absorb heat from the barrier and to transfer heat to the reactor along the heatable length thereof for providing the heat exchange with the process gas to that the hottest part of the barrier is heating the coolest part of the heating gas in the second flow channel.

11. The method of claim 10, wherein the heating gas is introduced into the flow channel at a temperature of about 1500° C. and has a temperature of about 1100° C. at the point of reversing said direction of flow.

12. The method of claim 10, wherein the length of the barrier is between about 0.1 and 0.7 of the heatable length of the reactor.

* * * * *